(12) United States Patent
Griesemer et al.

(10) Patent No.: US 12,102,920 B2
(45) Date of Patent: Oct. 1, 2024

(54) DYNAMIC 3D ENVIRONMENT GENERATION

(71) Applicant: Highwire Games LLC, Seattle, WA (US)

(72) Inventors: Jaime Griesemer, Seattle, WA (US); Mark Pottorf, Bothell, WA (US); Nicholas Gulezian, Redmond, WA (US); Randal Shaffer, Seattle, WA (US); Matt Salladay, Kingston, WA (US); Joe Filomena, Bellevue, WA (US); Jared Noftle, Woodinville, WA (US)

(73) Assignee: HIGHWIRE GAMES LLC, Seattle, WA (US)

( * ) Notice: Subject to any disclaimer, the term of this patent is extended or adjusted under 35 U.S.C. 154(b) by 412 days.

(21) Appl. No.: 17/438,682

(22) PCT Filed: Mar. 10, 2020

(86) PCT No.: PCT/US2020/021817
§ 371 (c)(1),
(2) Date: Sep. 13, 2021

(87) PCT Pub. No.: WO2020/190565
PCT Pub. Date: Sep. 24, 2020

(65) Prior Publication Data
US 2022/0143509 A1 May 12, 2022

Related U.S. Application Data (60) Provisional application No. 62/820,461, filed on Mar. 19, 2019.

(51) Int. Cl.
*A63F 13/65* (2014.01)
*G06T 15/00* (2011.01)
*G06T 17/00* (2006.01)

(52) U.S. Cl.
CPC ...... *A63F 13/65* (2014.09); *A63F 2300/5526* (2013.01); *A63F 2300/60* (2013.01);
(Continued)

(58) Field of Classification Search
CPC ... G06T 2210/61; G06T 15/00; G06T 15/005; G06T 17/00; G06T 17/005;
(Continued)

(56) References Cited

U.S. PATENT DOCUMENTS 7,038,694 B1 5/2006 Santodomingo et al.
7,290,216 B1 * 10/2007 Kawahara ............... G06T 17/00
715/762

(Continued)

FOREIGN PATENT DOCUMENTS

CN 107754315 A 3/2018
CN 108543311 A 9/2018
(Continued)

OTHER PUBLICATIONS

"Dynamic 3D Scene Graphs," by Andrew Top, published Dec. 10, 2008. Source: https://www.gamedev.net/tutorials/_/technical/graphics-programming-and-theory/dynamic-3d-scene-graphs-r2590/ (Year: 2008).*

(Continued)

*Primary Examiner* — Steven J Hylinski
(74) *Attorney, Agent, or Firm* — Brian D. Kaul; Westman, Champlin & Koehler, P.A.

(57) ABSTRACT

In a computer-implemented method of generating a virtual 3D environment, a hierarchy of slots is provided. The slots are organized in tiers from one or more top tier slots to one or more bottom tier slots. Each slot defines a portion of a 3D environment and includes a plurality of layouts. Each layout of a non-bottom tier slot defines a position of at least one slot from a lower tier within the portion of the 3D environment.

(Continued)

One or more of the top tier slots are positioned within the 3D environment. The 3D environment is generated by randomly selecting one of the plurality of layouts of the top tier slot and the lower tier slots, and populating each of the selected layouts with one or more objects. The 3D environment is rendered for display.

20 Claims, 7 Drawing Sheets

(52) U.S. Cl.
CPC ....... *A63F 2300/6009* (2013.01); *G06T 15/00* (2013.01); *G06T 15/005* (2013.01); *G06T 17/00* (2013.01); *G06T 17/005* (2013.01); *G06T 2210/61* (2013.01)

(58) Field of Classification Search
CPC .......... A63F 2300/5526; A63F 2300/60; A63F 2300/6009; A63F 13/60; A63F 13/65
See application file for complete search history.

(56) References Cited

U.S. PATENT DOCUMENTS

| | | |
|---|---|---|
| 8,115,765 B2 | 2/2012 | Sommers |
| 9,317,627 B2 | 4/2016 | Gielis |
| 11,017,592 B2* | 5/2021 | Babu J D ................. G06F 9/44 |
| 2002/0063713 A1 | 5/2002 | Sowizral et al. |
| 2003/0011637 A1* | 1/2003 | Boudier ................ G06T 17/005 |
| | | 715/771 |
| 2004/0189668 A1* | 9/2004 | Beda ....................... G06T 11/60 |
| | | 345/619 |
| 2005/0039176 A1 | 2/2005 | Fournie |
| 2005/0171754 A1 | 8/2005 | Santodomingo et al. |
| 2012/0190446 A1 | 7/2012 | Rogers |
| 2018/0353859 A1 | 12/2018 | Asakura et al. |

FOREIGN PATENT DOCUMENTS

| | | |
|---|---|---|
| EP | 3047885 A1 | 7/2016 |
| JP | 2017097568 A | 6/2017 |
| WO | 2020190565 A1 | 9/2020 |

OTHER PUBLICATIONS

International Search Report and Written Opinion from corresponding International Application No. PCT/US2020/021817, mailed Jun. 9, 2020.

J. Noghani et al., "Randomly Generated 3D Environments for Serious Games" Conference Paper—Mar. 2010, 9 pages.

Hughes, Van Dam, McGuire, Sklar, Foley, Feiner, Akeley: "Computer Graphics—Principles and Practice. Third Edition", Jul. 1, 2013, Addison-Wesley, XP002799170, ISBN: 978-0-321-39952-6, 47 pages.

* cited by examiner

FIG. 10

DYNAMIC 3D ENVIRONMENT GENERATION

CROSS-REFERENCE TO RELATED APPLICATION

This Application is a Section 371 National Stage Application of International Application No. PCT/US2020/021817, filed Mar. 10, 2020 and published as WO 2020/190565 A1 on Sep. 24, 2020, in English, which claims the benefit of U.S. Provisional Application Ser. No. 62/820,461 which was filed Mar. 19, 2019, the contents of which are hereby incorporated by reference in their entirety.

FIELD

Embodiments of the present disclosure relate to the generation of virtual three-dimensional (3D) environments and, more specifically, to the generation of dynamic virtual 3D environments having randomized features.

BACKGROUND

Three-dimensional (3D) video games, like Call of Duty or Fortnite, let players experience a virtual 3D environment or game world as if they were looking through the eyes of someone who was there. Such a game world is displayed on a computer or TV screen as a collection of flat polygons, with each polygon representing the face of an object, such as a wall, and painted to resemble concrete, bricks, or some other object. A very simple rectangular house, for example, might have four polygons for its four walls, four polygons for its roof, and one polygon for its floor. The wall polygons might be painted to look like stucco, and the roof polygons might be painted to look like roof shingles, while the floor polygon is painted to look like carpet. More polygons could be inserted within the wall polygons to create doors and windows.

Game creators design these game world 3D environments much like an architect designs a building. They can draw lines on a two-dimensional plane to represent walls, or they can draw all the edges of each polygon in a three-dimensional space. Game creators use special software, called an "Editor," to place these polygons inside the game world, assembling buildings, streets, vehicles, and anything else that is visible to players. Modern 3D games display tens of thousands of these polygons on the screen at a time in an effort to make the game world look as realistic as possible.

Designing and building these 3D environments is extremely time consuming. So, for a game created using these conventional methods, the physical structure of the game world typically doesn't change once it has been built. Thus, the 3D environment remains substantially unchanged each time it is regenerated.

3D video games are designed to give players a series of challenges to complete within a game world. Players are not normally able to complete each challenge or level of a game the first time they try. In some cases, it could take dozens of attempts before players complete a challenge. In a conventional game, this means players will move through the same, identical game world or game world portion many times as they try to complete a challenge. This becomes repetitive and reduces suspense and enjoyment.

Recently, some video games, such as "No Man's Sky," have created technology that allows computer algorithms to generate game world terrain, rather than requiring human beings to design it manually. This method is called "procedural generation." Before video games used procedural generation to create terrain in game worlds, other software, such as the Bryce Terrain Editor, allowed artists to procedurally generate 3D scenes for artwork and films.

However, the algorithmically-generated worlds created by procedural generation techniques are not ideal for video games because video games benefit significantly from the creativity of human designers who design the game world for challenge and emotion. As of now, there has been no way to teach a computer how to create game worlds algorithmically in ways that produce levels of challenge and emotion that are capable from talented human designers. Furthermore, procedural generation has been limited to natural terrain, flora, and fauna, but has not included human-made building structures.

SUMMARY

Embodiments of the present disclosure are generally directed to computer-implemented methods and computer systems for generating a virtual 3D environment having randomized features. In one embodiment of a computer-implemented method of generating a virtual 3D environment, a hierarchy of slots is provided. The slots are organized in tiers from one or more top tier slots to one or more bottom tier slots. Each slot defines a portion of a 3D environment and includes a plurality of layouts. Each of the layouts of a non-bottom tier slot defines a position of at least one slot from a lower tier within the portion of the 3D environment defined by the non-bottom tier slot. One or more of the top tier slots are positioned within the 3D environment. The 3D environment is generated by randomly selecting one of the plurality of layouts of the top tier slot and the lower tier slots included within the top tier slot, and populating each of the selected layouts with one or more objects associated with each slot arranged in the selected layout. The 3D environment is then rendered for display.

In one embodiment, the objects associated with one or more of the slots include one or more dynamic objects, each having a plurality of associated object options. The population of each of the selected layouts with one or more objects associated with each slot arranged in the selected layer includes randomly selecting one of the object options associated with each of the dynamic objects and populating the corresponding selected layouts with the randomly selected object options.

In one embodiment, the objects associated with one or more of the slots include one or more static objects, each defining a single object. The population of each of the selected layouts with one or more objects associated with each slot arranged in the selected layer includes populating one or more of the selected layouts with the associated static objects.

In one embodiment, the portions of the 3D environment that are defined by the slots decrease in volume with each lower tier.

In one embodiment, each of the bottom tier slots defines a bottom portion of the 3D environment and includes one or more layouts each defining a position of one or more objects within the bottom portion.

In one embodiment the hierarchy of slots includes a block slot representing a city block or gameplay level, the block slot including one or more layouts defining a position of one or more lower tier slots within a block portion of a 3D environment. In one embodiment, each of the layouts of the block slot define a position of one or more plot slots within the block portion, each of the plot slots represents a plot of land and includes one or more layouts each defining a position of one or more lower tier slots within a plot portion of the block portion.

In one embodiment, the hierarchy of slots includes a building slot that represents a building. The building slot includes one or more layouts defining a position of one or more lower tier slots within a building portion of a 3D environment. The building slot may include a plurality of associated objects that define features of the building. These features may include one or more exterior shape objects each defining a unique exterior shape of the building, one or more exterior appearance objects each defining a unique appearance of an exterior of the building, and/or one or more window objects each defining a unique window of the building.

In one embodiment, each of the layouts of the building slot defines a position of one or more level slots within the building portion. Each of the level slots represents a level of the building and includes one or more layouts that define a position of one or more lower-tier slots within a level portion of the building portion.

In one embodiment, the level slot has a plurality of associated objects that defines features of the level of the building that include one or more stair objects each defining unique stairs of the level, and/or one or more hallway objects each defining a unique hallway of the level.

In one embodiment, each room slot has a plurality of associated objects that define features of the room that include door objects each defining a unique door of the room, wall objects each defining a unique type of wall surface of the room, ceiling objects each defining a unique type of ceiling of the room, lighting objects each defining a unique light feature of the room, floor objects each defining a unique floor of the room, and/or window objects each defining a unique window of the room.

In one embodiment, each of the layouts of the room slot define a position of one or more furniture slots within the room portion. Each furniture slot includes one or more layouts defining a position of one or more furniture objects within a furniture portion of the room portion, each furniture object representing one or more pieces of furniture. The furniture objects may include one or more bed objects each defining a unique bed, one or more chair objects each defining a unique chair, one or more desk objects each defining a unique desk, one or more rug objects each defining a unique rug, one or more dresser objects each defining a unique dresser, and/or one or more bed and dresser objects each defining a unique bed and dresser set.

In one embodiment of the method, the rendered 3D environment is displayed as a first 3D environment. Subsequently, the 3D environment is regenerated by randomly selecting one of the plurality of layouts of the top tier slot and the lower tier slots included within the top tier slot, and populating each of the selected layouts with one or more objects associated with each slot arranged in the selected layout. The regenerated 3D environment is then displayed as a second 3D environment, which is different from the first 3D environment.

In one embodiment of the method, the rendering of the 3D environment includes generating a seed of data that defines the 3D environment. The seed is then transmitted to a plurality of client computing devices. A display of the 3D environment by each of the client computing devices is synchronized using the corresponding seed.

In one embodiment, the rendering of the 3D environment includes rendering the 3D environment using the virtual 3D environment rendering engine.

One embodiment of the computer-implemented system for generating a virtual 3D environment is included in a non-transitory computer readable medium. The system includes a hierarchy of slots organized in tiers from one or more top tier slots to one or more bottom tier slots. Each slot defines a portion of a 3D environment and includes a plurality of layouts. Each of the layouts of a non-bottom tier slot defines a position of at least one slot from a lower tier within the portion of the 3D environment defined by the non-bottom tier slot. An editor tool system is configured to position one of the top tier slots within the 3D environment. A generator of the system is configured to generate the 3D environment by randomly selecting one of the plurality of layouts of the top tier slot and the lower tier slots included within the top tier slot, and populating each of the selected layouts with one or more objects associated with each slot arranged in the selected layout. A virtual 3D environment rendering engine of the system is configured to render the 3D environment for display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
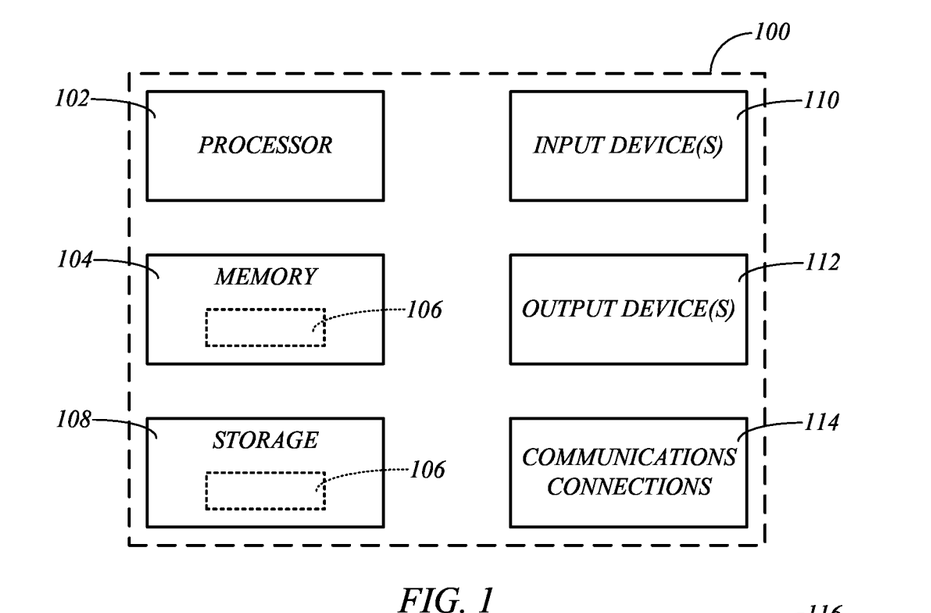
FIG. 1 is a simplified diagram illustrating a generalized example of a suitable computing device or environment, in which described methods, embodiments, techniques, and technologies relating, for example, to the generation of dynamic virtual 3D environments can be implemented.

Embodiments of the present disclosure are generally directed to computerized methods or software and computer systems configured to execute the software for the design and generation of dynamic virtual 3D environments on a display. FIG. 1 is a simplified diagram illustrating a generalized example of a suitable computing device or system, or computing environment 100 in which described methods, embodiments, techniques, and technologies relating, for example, to the generation of virtual 3D environments can be implemented. The computing environment 100 example is not intended to suggest any limitation as to the scope of use or functionality of the technologies disclosed herein, as each technology may be implemented in diverse general-purpose or special-purpose computing environments. For example, each disclosed technology may be implemented with other computer system configurations, including multiprocessor systems, microprocessor-based or programmable consumer electronics, embedded platforms, network computers, video game consoles, game engines, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 100 may include at least one processor or processing unit 102 and memory 104, which may represent local or network-accessible memory. The processor 102 executes computer-executable instructions and may be a real or a virtual processor. In a multi-processing system, multiple processing units execute computer-executable instructions to increase processing power and as such, multiple processors can run simultaneously. The memory 104 is non-transitory and may be volatile memory (e.g., registers, cache, RAM), non-volatile memory (e.g., ROM, EEPROM, flash memory, etc.), or some combination of the two. The memory 104 stores software 106, such as an environment generator module that, when executed by a processor, such as processor 102, can implement one or more of the embodiments and functions described herein.

The computing environment 100 may include additional features, such as, for example, data storage 108, one or more input devices 110, one or more output devices 112, and one or more communication connections 114. An interconnection mechanism (not shown) such as a bus, a controller, or a network, may be used to interconnect the components of the computing environment 100. Typically, operating system software (not shown) provides an operating environment for executing code in the computing environment 100, and coordinating activities of the components of the computing environment 100.

The data storage 108 and memory 104 may be removable or non-removable, and can include selected forms of non-transitory, machine-readable media. In general, machine-readable media includes magnetic disks, magnetic tapes or cassettes, non-volatile solid-state memory, CD-ROMs, CD-RWs, DVDs, magnetic tape, and optical data storage devices, or any other machine-readable, non-transitory medium which can be used to store information, and which can be accessed within the computing environment 100. The data storage 108 may store the software or code 106, which can implement embodiments described herein.

The data storage 108 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 110 may include one or more touch input devices, such as a keyboard, keypad, mouse, pen, joystick, touchscreen, touch pad, or trackball, a voice input device, a hand gesture recognition device, a scanning device, a microphone or other sound transducer, or another device that provides input to the computing environment 100. The output device(s) 112 may include a display, which can be used to display a graphical user interface for editing, creating, and/or viewing a 3D environment, such as that formed in accordance with embodiments of the present disclosure. Optional output device(s) 112 also include a printer, speaker, CD-writer, or another device that provides output from the computing environment 100.

The communication connection(s) 114 enable wired and/or wireless communication over a communication medium (e.g., a connecting network) to another computing entity, such as a server, a client computing device, a database, and/or other devices. The communication medium may be used to convey information such as computer-executable instructions, compressed graphics information, and/or other data in a modulated data signal, for example.

Figure 2:
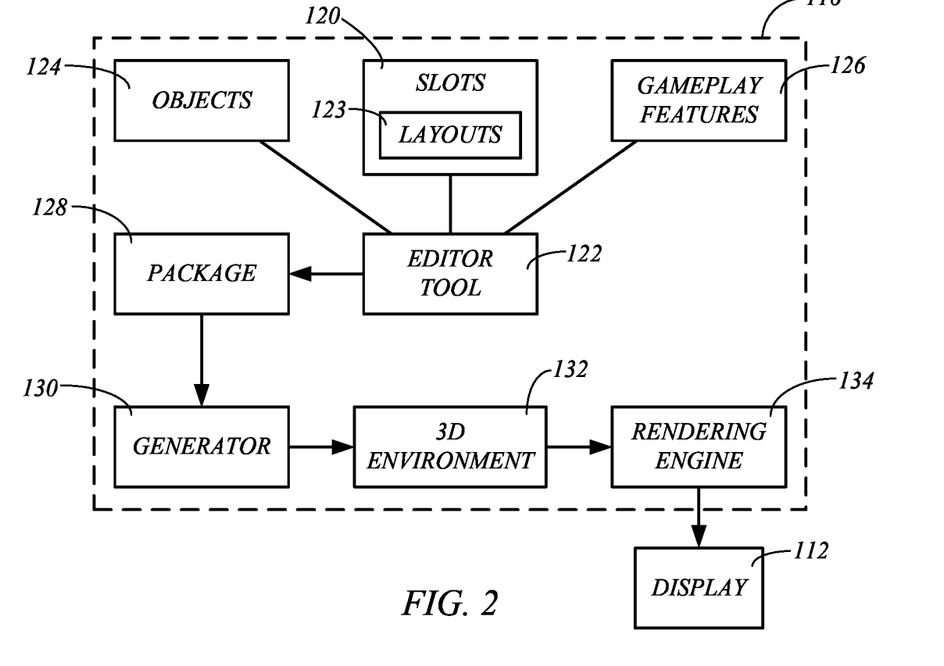
FIG. 2 is a simplified diagram of an example of an environment generator module, in accordance with embodiments of the present disclosure.

FIG. 2 is a simplified diagram of an example of an environment generator module 116 defined by the code or software 106, in accordance with embodiments of the present disclosure. It should be understood, however, that the illustrated module 116 may be implemented by different software programs executed on the same or different computing devices.

As mentioned above, embodiments of the environment generator module 116 allow game designers and artists to design bespoke components or features of 3D environments, such as 3D game worlds, which include randomized features that are changed each time the 3D environment is generated or displayed, such as each time the game or a level of the game is played. Examples of 3D environment features that may be randomized include city blocks, buildings, interior and exterior surfaces of buildings, levels or floors of buildings, rooms, furniture sets, game characters, game logic, man-made outdoor objects, such as streets and fences, as well as natural outdoor objects, such as trees and bushes, and/or other features of a 3D game world environment. Designers can also designate the parts of the 3D environment that may change randomly and the parts that remain the same for each generation of the 3D environment. Thus, a game designer may be able to implement multiple randomly changing features in a 3D environment ranging from the fabric of a couch to the location of entire buildings within a city block.

The dynamic virtual 3D environment may be designed or built using slots 120 (e.g., templates) that define a group (e.g., a list) of objects that could be contained within any single, 3D volume of space within the virtual 3D environment. Each volume of space could be as large as an entire city block, or as small as a kitchen table, for example. The slots 120 are organized hierarchically, meaning that a high-level or top tier slot, such as a city block, contains a hierarchy of smaller slots, which define more and more finer detail of the portion of the virtual 3D environment within the top tier slot. Thus, the top tier slot includes lower tier slots, which may in turn include still lower tier slots, etc. This may continue until the last or bottom tier slot is reached, which defines final objects or actors that are presented in the portion of the 3D environment corresponding to the bottom tier slot.

An editor tool 122 of the environment generator module 116 may be used to create and edit a virtual 3D environment (e.g., layout of the architecture of the 3D environment) using the slots 120. In some embodiments, the editor tool 122 may be used to edit or design the slots 120, edit or design layouts 123 associated with the slots 120, edit or design objects 124, associate the objects 124 with the slots 120, edit gameplay features 126 (e.g., mission objects, etc.), associate the gameplay features with the slots 120, and/or edit or design other features of a virtual 3D environment. The created virtual 3D environment may be output or saved to the memory 104 by the editor as a 3D environment package 128.

A generator 130 operates to generate a virtual 3D environment 132 based on the 3D environment package 128. In one embodiment, the generator 130 randomizes features defined by the slots 120, objects 124, gameplay features 126, and/or other components of the 3D environment package, as discussed below in greater detail, to generate the 3D environment 132. The generator 130 may supplement or replace certain software code of the editor tool 122 with its own software code, so the design of the virtual 3D environment or game world for a given game comes from the generator 130 each time the game is played, rather than from the editor tool 122, for example.

A 3D environment rendering engine 134 operates to render the 3D environment 132 on a display 112, simulate physics within the game world, give non-player characters within the game world artificial intelligence, allow human players to play with or against each (e.g., over a network of devices), and/or other functions to transform the generated 3D environment 132 into a functional game. The rendering engine 134 may be implemented using a conventional 3D game generation engine, such as Unreal Engine 4 (UE4).

In some embodiments, the 3D environment generation module 116 may be integrated with an existing 3D game generation engine, which is a commercially-available set of software libraries that render graphics on a TV, computer, or smartphone screen, simulate physics within a game world, give non-player characters within the game world artificial intelligence, and allow human players to play with or against each other over a network of devices. As discussed below, the 3D environment generation module may be integrated within Unreal Engine 4 (UE4), or similarly implemented in other 3D game generation engines.

The one or more layouts 123 associated with each slot 120 provide a unique template of one possible design of the portion of the 3D environment occupied by the slot 120. While a slot 120 may define a group of associated objects 124 and lower tier (child) slots 120 that might be contained within a three-dimensional volume of space corresponding to the slot 120, each layout 123 describes where each of these objects 124 and lower tier slots 120 are located within this three-dimensional volume. In other words, a layout 123 shows the physical location of each lower tier slot 120 or object 124 within the three-dimensional portion of the slot 120, such as where rooms are located within a building or where furniture is located within a room. For example, a building slot that defines a building environment may include a child slot (first lower tier) defining a floor or level of the building, which may include a child slot (second lower tier) defining a room, which may include a child slot (third lower tier), which may be a bottom slot defining one or more final objects or actors, such as a table and chairs.

Figure 3:
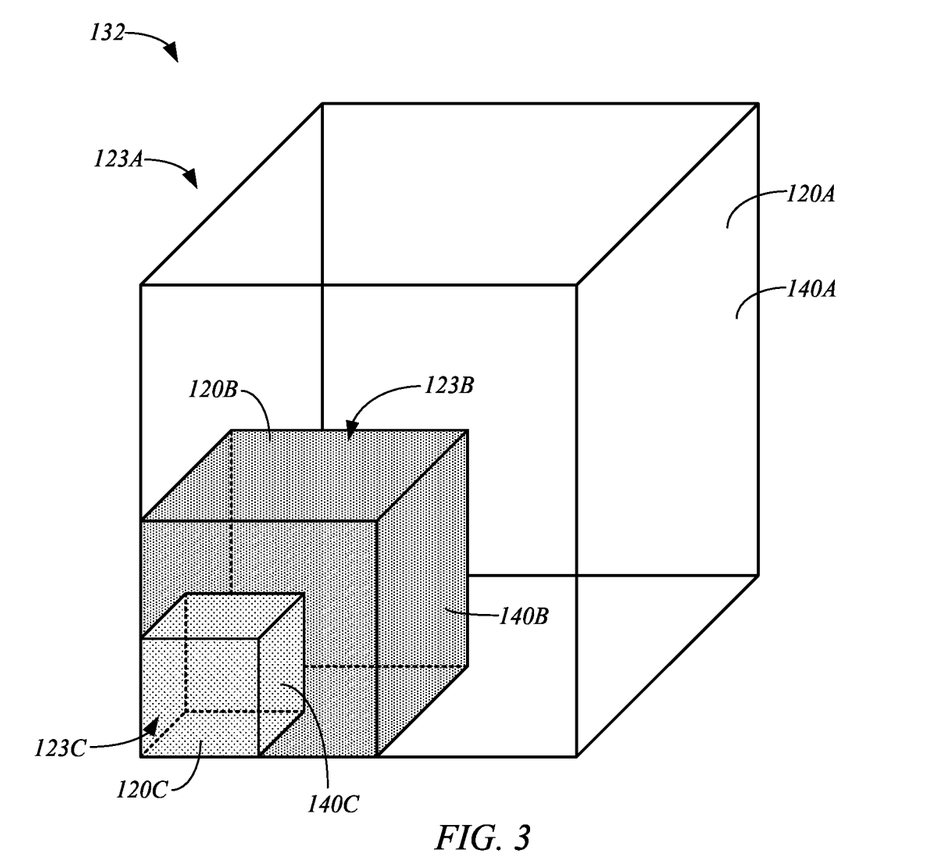
FIG. 3 is a simplified block diagram of an example of a volume or portion of a virtual 3D environment represented by multiple hierarchically organized slots, in accordance with embodiments of the present disclosure.

FIG. 3 is a simplified block diagram of an example of a volume or portion 140 (hereinafter "portion") of a virtual 3D environment 132, represented or defined by multiple hierarchically organized slots 120, in accordance with embodiments of the present disclosure. Each of the slots 120 defines a corresponding portion of the 3D environment 132. Accordingly, each lower tier slot 120 defines a subset of the volume or portion 140 of the next higher tiered slot 120.

Non-bottom tier slots 120 define their portions 140 of the 3D environment using one or more associated layouts 123, each of which defines a position of at least one slot 120 from a lower tier within the portion 140 of the 3D environment. As shown in FIG. 3, a top tier slot 120A defines the volume or portion 140A of the 3D environment 132 using associated layouts 123 that define positions of one or more lower tier slots, such as slot 120B, within the portion 140A, as shown in FIG. 3. Likewise, the slot 120B defines a volume or portion 140B of the 3D environment 132 within the portion 140A using associated layouts 123 that define positions of one or more lower tier slots within the portion 140B, such as slot 120C. The layouts 123 associated with the slot 120C define positions of one or more lower tier slots and objects within a portion 140C of the portion 140B of the virtual 3D environment 132. This hierarchy of slots 120 can extend to additional lower tier slots 120 having layouts that define the portions or subsets of higher tier slots 120 until a bottom tier slot is reached. The bottom tier slot does not include layouts of lower tier slots, and completes the definition of that particular subset of the virtual 3D environment 132.

Each time the 3D environment is generated, one of the unique layouts 123 for each slot may be randomly selected by the generator 130 to form the virtual 3D environment 132 for rendering on a display. Thus, for example, each time the virtual 3D environment 132 is rendered, such as when a game is played, features of the 3D environment 132 may be randomly changed based on the random selection of the layouts 123 of the slots 120 and objects 124 that at least partially define the virtual 3D environment 132.

As mentioned above, in addition to the variety provided by the multiple unique layouts 123, the objects 124 (furniture, walls, floors, etc.) associated with each slot 120 may include a variety of associated options, such as various surface or material options, and other options that further define the virtual 3D environment 132. For example, a wall object could be "painted" to resemble stucco, brick, or concrete blocks. Similarly, objects 124 may include different design variations of the object 124. For example, a sword object may have associated options that define the design of the sword (size, shape, color, surface texture, etc.), a lamp may have a variety of associated options that define the design of the lamp (size, number of lighting elements, shape, ornamental features, etc.). Thus, one or more objects 124 of the slots 120 may be configured with associated options that may be randomized by the generator 130 to provide a different variation of the objects 124 each time the 3D environment 132 is generated or rendered for display.

The slots 120 having multiple layouts 123 may be designated by the creator as dynamic slots having features that are randomly selected when the 3D environment 132 is generated (e.g., each time a game level is played). Thus, the 3D environment may be re-generated many times (e.g., more than 100), while creating a unique 3D environment 132 each time.

The slots 120 may also be designated as static slots, which have a fixed layout and fixed objects that are not randomized when the 3D environment 132 is generated by the generator 130. These slots 120 may, for example, only generate during editor time, effectively "baking" the slot 120 with the desired assets or objects 124 and a layout 123 that will remain the same each time the corresponding portion of the 3D environment 132 is generated. Thus, static slots 120 are similar to conventional 3D environment generating practices. In some embodiments, the designation of a slot 120 having multiple layouts 123 and objects 124 having multiple associated options as a static slot 120, freezes a single layout for the slot 120. Additionally, the static designation of the slot 120 may freeze the objects 124 and other features to have only a single configuration.

While the back-end code of the generator 130 may use one standardized system for generating all of the hierarchical slots 120 (e.g., it is slot tier-agnostic and doesn't rely on the type of tier), it is useful to break up the different levels of slots 120 into specific layers with a description that may correspond with the real world. The following is an exemplary list of hierarchical slots 120 in accordance with embodiments of the present disclosure.

A block slot may be the top tier slot within the hierarchy of slots 120 defining the randomizable 3D environment 132. In some embodiments, a block slot represents a city block or a gameplay level of a game within a block portion (e.g., a volume) of the virtual 3D environment 132. Thus, the block slot may define one full city block or a full level of gameplay, through which a player must proceed to complete the game level. Each block slot includes layouts 123 that define positions of lower tier slots and/or objects within the block portion, such as a layout of plot slots or other lower tier slots within the 3D volume of the block portion, for example.

Plot slots may be in a lower tier relative to block slots. Plot slots define a plot portion subdivision of the 3D environment 132, such as a subdivision of the block portion of a block slot. Plot slots may define different volumes of the 3D environment 132, such as a small plot slot defining a relatively small portion of the 3D environment, a large plot slot defining a relatively large portion of the 3D environment, and a medium plot slot defining a portion of the 3D environment that is between that defined by the small and large plot slots. The plot slots may also define specific features within the corresponding plot portion of the 3D environment, such as roads (road plot slots), alleys (alley plot slots), walkways (walkway plot slots), and other features. Each plot slot includes one or more layouts 123 each defining unique positions of lower tier slots and/or objects within the 3D volume of the corresponding plot portion, such as a layout of building slots within the 3D volume of the plot portion, for example.

The objects 124 of plot slots may be fixed to provide fixed features of the plot portion that remain the same each time the plot portion is generated or rendered in the 3D environment. Also, the objects of the plot slots may be dynamic and have associated options or features that allow the objects to be randomized to create a different appearance of the plot portion each time the 3D environment is generated or rendered. For example, plot slots may include road objects corresponding to a road in the 3D environment that may take the form of a blacktop road, a cement road, a gravel road, or another type of road.

Building slots are used to define or represent a building structure within a building portion subdivision of the virtual 3D environment 132. Building slots may be in a lower tier relative to the plot slots, and define building structures within the plot portion of a plot slot. Building slots may define or represent different types of building structures within the building portion, such as full buildings, carports (carport building slot), bridges (bridge building slot), houses (house building slot), and other types of building structures. Each building slot includes one or more layouts 123 each defining unique positions of lower tier slots and/or objects within the 3D volume of the corresponding building portion, such as floor or level slots and/or room slots, for example.

Associated objects 124 of building slots may be fixed to provide fixed features of a building portion that remain the same each time the building is generated or rendered in the 3D environment 132. Also, the objects of the building slots may be dynamic and have associated options or features that allow the objects to be randomized to create a different appearance of the building structure each time the building portion of the 3D environment 132 is generated or rendered. Examples of the associated objects 124 of building slots may include exterior shape objects each defining a unique exterior shape of the building, exterior appearance objects each defining a unique appearance of an exterior of the building, and/or one or more window objects each defining a unique window of the building, for example.

Floor or level slots (hereinafter "level slot") are used to define or represent a level within a level portion subdivision of the virtual 3D environment 132. Each level slot may be in a lower tier relative to the building slot, and define features of a level of the building portion of a building slot. Each level slot includes one or more layouts 123 each defining unique positions of lower tier slots and/or objects within the 3D volume of the corresponding level portion, such as room slots, for example.

Associated objects 124 of level slots may be fixed to provide fixed features of a level portion that remain the same each time the level is generated or rendered in the 3D environment 132. Also, the objects of the level slots may be dynamic and have associated options or features that allow the objects to be randomized to create a different appearance of the level portion each time the 3D environment 132 is generated or rendered. Examples of the associated objects of level slots may include stairs objects, each of which defines a unique stairway within the level portion, and/or one or more hallway objects, each of which defines a unique hallway within the level portion, for example.

Room slots are used to define or represent a room within a room portion subdivision of the virtual 3D environment. Each room slot may be in a lower tier relative to the level slot and define features of a room of the level portion of a level slot. Each room slot includes one or more layouts each defining unique positions of one or more lower tiered slots and/or objects within the 3D volume of the corresponding room portion, such as furniture slots, for example.

Room slots may define different volumes of the 3D environment 132, such as a small room slot defining a relatively small room portion of the 3D environment 132, a large room slot defining a relatively large room portion of the 3D environment 132, and a medium room slot defining a room portion of the 3D environment 132 that is between that defined by the small and large room slots. The room slots may also be categorized based on a type of room that is to be depicted within the room portion of the 3D environment 132. For example, an office room slot may include layouts 123 representing or defining a room design having typical office features, a bedroom room slot may include layouts 123 representing or defining a room design having typical bedroom features, a kitchen room slot may include layouts 123 representing or defining a room design having typical kitchen features, a dining room may include layouts 123 representing or defining a room design having typical dining room features, etc.

Associated objects 124 of room slots may be fixed to provide fixed features of a room portion that remain the same each time the room portion is generated or rendered in the 3D environment 132. Also, the objects 124 of the room slots may be dynamic and have associated options or features that allow the objects to be randomized to create a different appearance of the room portion each time the 3D environment 132 is generated or rendered. Examples of the associated objects 124 of room slots may include door objects, each defining a unique door of the room, wall objects each defining a unique type of wall surface of the room, ceiling objects each defining a unique type of ceiling of the room, lighting objects each defining a unique light feature of the room, floor objects each defining a unique floor of the room, and/or window objects each defining a unique window of the room.

Furniture slots are used to define or represent furniture within a furniture portion subdivision of the 3D environment 132. Furniture slots may be in a lower tier relative to the room slots, and define furniture objects within the room portion of a room slot. Each furniture slot may include one or more layouts 123 each defining unique positions of one or more lower tiered slots and/or objects within the 3D volume of the corresponding furniture portion. The furniture slots may also be categorized based on a type of furniture that is to be depicted within the furniture portion of the 3D environment 132. For example, an office furniture slot may include layouts representing or defining a typical set of office furniture (e.g., desk, office chairs, tables, etc.), a bedroom furniture slot may include layouts representing or defining a typical set of bedroom furniture (e.g., bed, end tables, dresser, chairs, etc.), a kitchen furniture slot may include layouts representing or defining a typical set of kitchen furniture (e.g., kitchen table, chairs, buffet table, counter, cabinets, etc.) a dining furniture slot may include layouts representing or defining a typical set of dining room furniture (e.g., dining room table, chairs, etc.), etc.

Associated objects 124 of furniture slots may be fixed to provide fixed features of a furniture portion that remain the same each time the furniture portion is generated or rendered in the 3D environment 132. Also, the objects of the furniture slots may be dynamic and have associated options or features that allow the objects to be randomized to create a different appearance of the furniture portion each time the 3D environment 132 is generated or rendered, such as a different type of furniture piece or set of furniture pieces (e.g., different chair or table design), and/or a different appearance of a furniture piece (e.g., different color, texture, etc.).

Examples of the associated objects 124 of furniture slots may include bed objects that represent or define unique beds, chair objects that define or represent unique chairs, desk objects that define or represent unique desks, rug objects that define or represent unique rugs, dresser objects that define or represent unique dressers, and/or bed and dresser objects that define or represent unique bed and dresser sets. For example, a bedroom furniture slot may include a layout having randomizable associated furniture objects, such as a "C4 Bed" set, a "Bed and Dresser" set, an "Empty bedroom" set, etc., and one of these associated furniture objects are produced in the corresponding furniture slot when the furniture portion of the 3D environment is generated or rendered.

Objects 124 are generally bottom tier or final elements that may be included within a layout 123 of a slot 120. Objects 124 may be used to define any item of the 3D environment 132, and may include associated options, as discussed above, which are randomly selected when the 3D environment 132 is generated. Thus, a wall object of a building slot may be a dynamic object having associated options, such as a painted surface, a stucco surface, and other surface types, for example. When the 3D environment 132 is generated or rendered, one of the associated options for the wall object is selected at random and the building is generated having a wall with the selected associated option (e.g., stucco surface).

Similarly, a chair object or a desk object, which may be associated with a furniture slot, may include multiple associated chair and desk designs. When the 3D environment 132 is generated or rendered, one of the associated options for the chair object or desk object is selected at random and the furniture portion is generated or rendered having the chair or desk with the selected associated option (e.g., reclining chair, large office desk), for example.

Spawn slots may also be bottom tier or final actor slots that may be included in a layout 123 of a slot 120. Spawn slots correspond to spawning objects related to gameplay such as enemies, or mission objectives or objects, for example. Thus, the spawn slots may define characters, objects, and logic needed to create gameplay challenges. For example, a spawn slot may contain a list of possible enemy types that might be present within a room, as well as how they interact with the environment, other characters, and the player. Thus, a spawn slot might contain a weapon emplacement that triggers automatically when the player enters the room, for example.

Figure 4A:
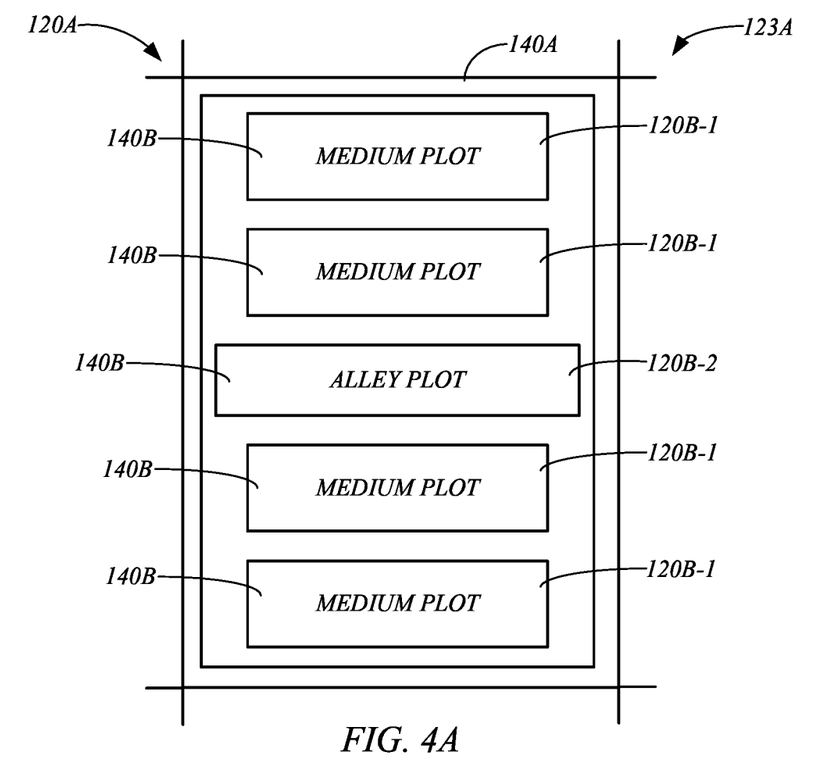
FIGS. 4A and 4B are simplified diagrams of exemplary layouts of a block slot, in accordance with embodiments of the present disclosure.
Figure 4B:
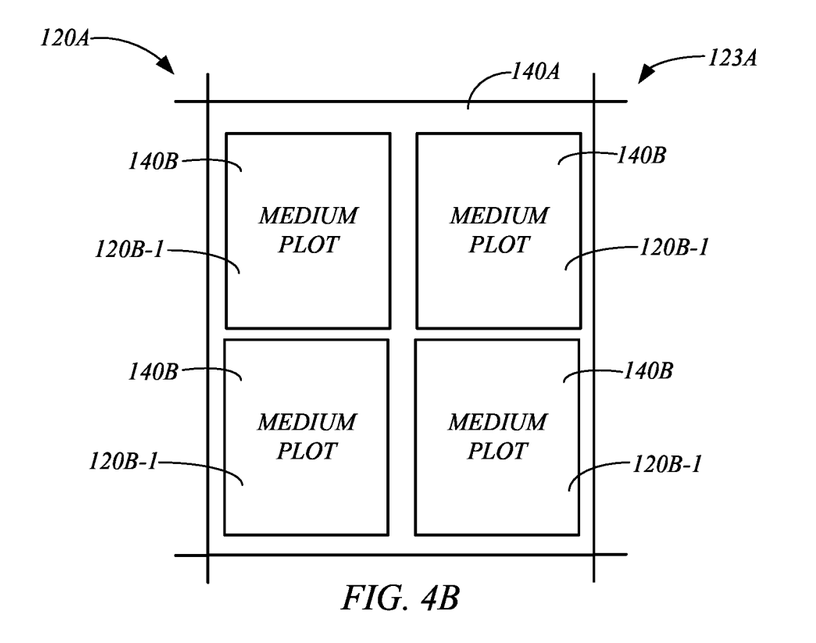

Exemplary layouts 123A of a block slot 120A illustrating the positioning of plot slots 120B within the block slot portion 140A of the 3D environment 132 are shown in the simplified illustrations of FIGS. 4A and 4B. As mentioned above, optional plot slots 120B include small plot slots, medium plot slots (shown) and large plot slots, as well as road plot slots, alley plot slots (shown), and other types of plot slots that could be used to define one or more plot portions 140B within the block portion 140A of the 3D environment 132 corresponding to the block slot 120A, for example. The layout 123A of FIG. 4A for the block slot 120A includes four medium plot slots 120B-1 and an alley plot slot 120B-2 in a rectangular block, while the layout of FIG. 4B defines a block portion 140A (e.g., square block) of four medium plot slots 120B-1. Block slots 120A may include these and other layouts.

Figure 5:
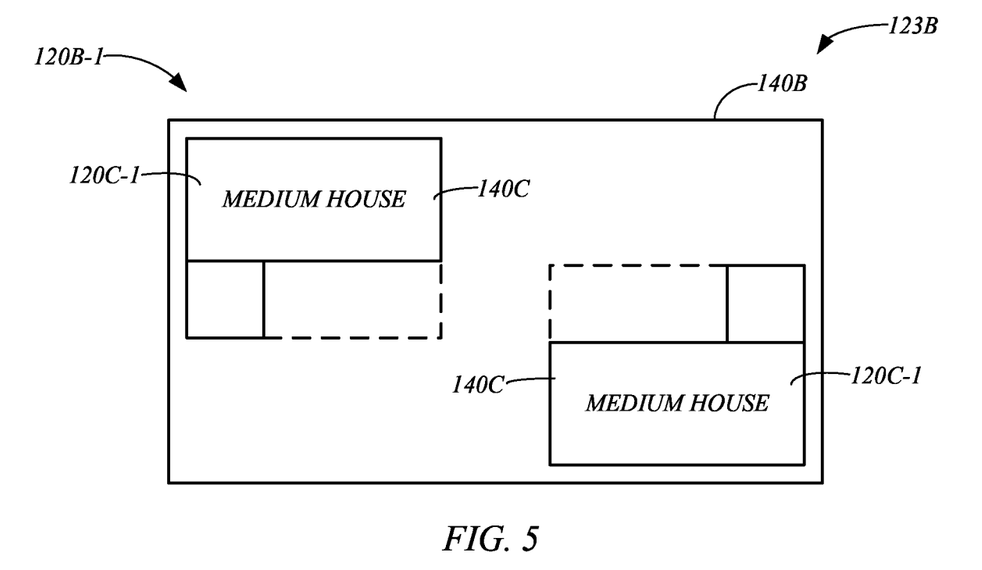
FIG. 5 is a simplified diagram of an exemplary layout of a plot slot, in accordance with embodiments of the present disclosure.

FIG. 5 is a simplified diagram of an example of a layout 123B of one of the medium plot slots 120B-1 of FIGS. 4A and 4B, which includes a pair of building slots 120C in the form of medium house building slots 120C-1 within the plot portion 140B. Other building slots 120C that may be included in a layout 123B of a medium plot slot 120B-1 include small and large house building slots, small, medium and large building slots, and other slots that may be used to further define the plot portion 140B. Accordingly, the layouts 123B of the plot slots 120B generally define the size and location of each building within the portion 140B of the 3D environment 132 corresponding to the plot slot 120B. Additionally, the plot slots 120B may determine exterior and non-building objects 124 and final actors including ambient sound, light sources, and other objects or characteristics of the 3D environment 132, for example.

Figure 6:
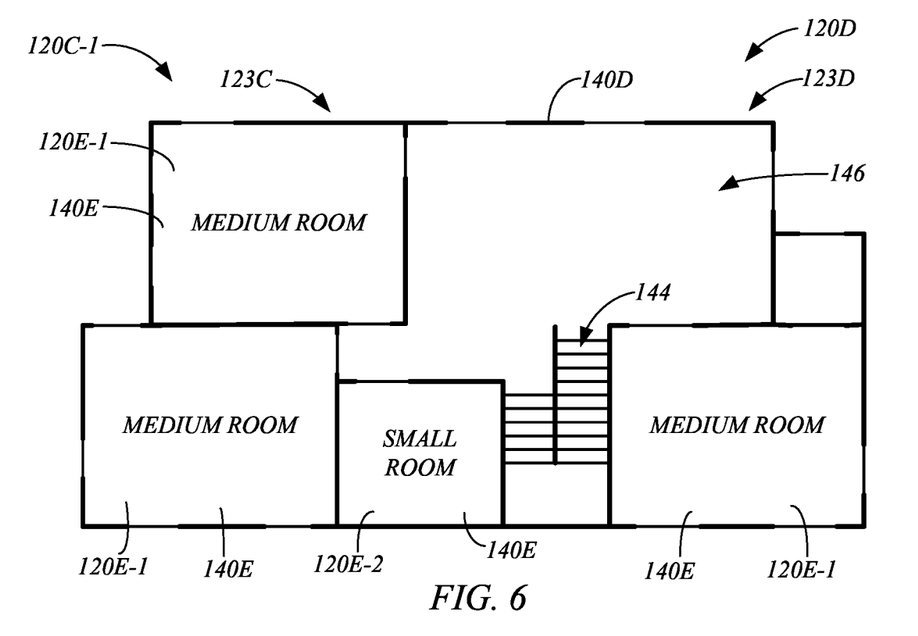
FIG. 6 is a simplified diagram of an exemplary layout of a building slot, in accordance with embodiments of the present disclosure.

FIG. 6 is a simplified diagram of an example of a layout 123C of a building slot 120C corresponding to a building portion, such as one of the medium house slots 120C-1, shown in FIG. 5. In the example of FIG. 6, the building slot 120C-1 includes multiple levels and, thus, the illustrated level of the building slot 120C-1 includes a level slot 120D having a layout 123D defining the position of multiple room slots 120E including medium room slots 120E-1 and a small room slot 120E-2 within the level portion 140D. The layout 123D of the level slot 120D (or the building slot 120C-1) may include predefined static features or objects and spaces, such as stairwells 144 connecting different floor or level slots 120D, open areas 146, and other features one may include in a level of a building. The layouts 123D for the level slots 120D may also include final objects or actors for any non-room areas, game logic including cover and artificial intelligent nodes for areas outside of room slots, connecting paths between room slots, and other features that may form a completed virtual 3D environment 132.

Figure 7:
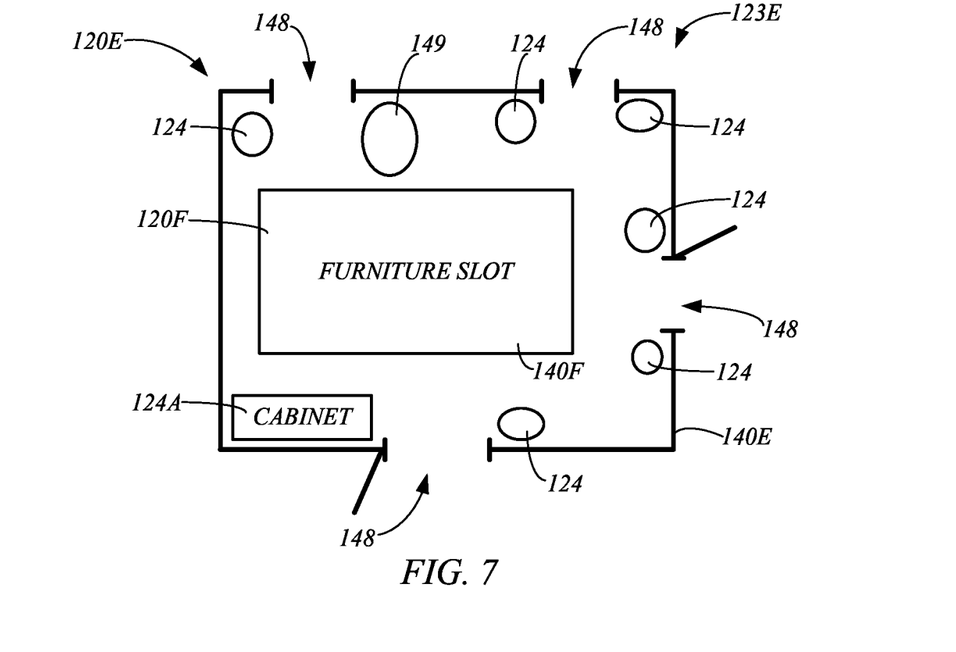
FIG. 7 is a simplified diagram of an exemplary layout of a room slot, in accordance with embodiments of the present disclosure.

FIG. 7 is a simplified diagram of an exemplary layout 123E for a room slot 120E, such as the medium room slot 120E-1 of FIG. 6. The room slot layout 123E may include furniture slots, such as furniture slot 120F, that defines a portion 140F of the 3D environment 132. The room slot 120e includes layouts 123E for fixed or dynamic objects 124, such as a cabinet furniture piece 124A. Additionally, the room slot layout 123E may include entry and exit points 148 for the room portion 140E, game logic including artificial intelligent nodes and cover nodes 149 within the room portion 140E, other objects and final actors.

Figure 8:
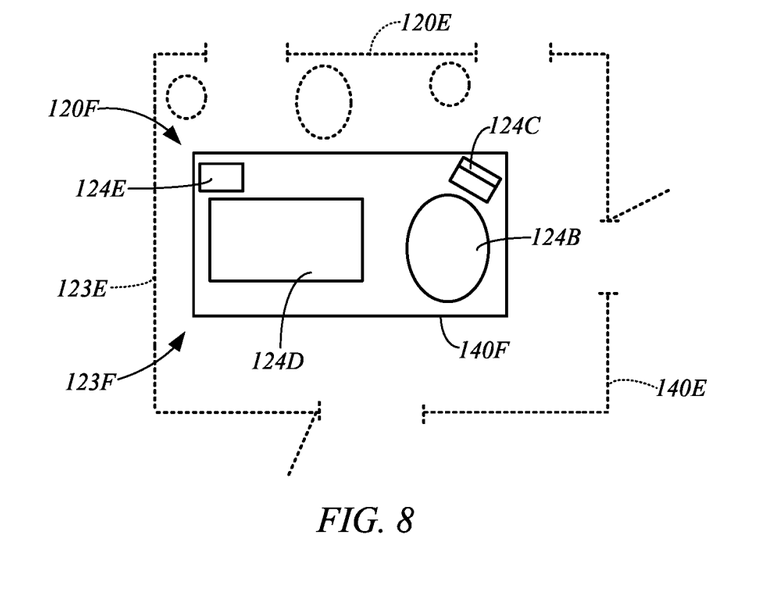
FIG. 8 is a simplified diagram of an exemplary layout of a furniture slot, in accordance with embodiments of the present disclosure.

FIG. 8 is a simplified diagram of an exemplary layout 123F for a furniture slot, such as the furniture slot 120F of FIG. 7, positioned within the corresponding room slot 120E. The layout 123F includes furniture objects 124, such as a table 124B, a chair 124C, a bed 124D, and an end table 124E, that may be randomized with different associated object options, as discussed above. The layout 123F may also include other objects and final actors, as well as game logic including cover and artificial intelligent nodes associated with the furniture objects.

Conventional techniques used in designing 3D games and their environments include the placement of "Mission Objects" throughout the 3D game environment. Mission Objects tell the game where to place enemy locations, booby-traps, weapons caches, high-value targets, mission objectives, etc. Normally, Mission Objects are carefully planned and placed by game designers to optimize the player's experience. But, obviously, designers can't place Mission Objects precisely within environments if these environments change each time the game is played.

Embodiments of the present disclosure allow game designers to assign properties and rules to Mission Objects, giving each Mission Object its own intelligence, so each Mission Object knows how to place itself within the 3D game environment 132 each time the environment 132 is randomly generated or rendered. In some embodiments, Mission Objects are defined for each game level by assigning rules and properties for each game level using the editor tool 122, such as through a suitable interface (e.g., pop-up menu, etc.). These rules and properties tell the system the kind of room or object the Mission Object must be contained within, how far away it must be located from other architecture or other Mission Objects, and/or other features.

For example, if the player's mission objective is to locate and recover a secret document, the Mission Object's rules could specify that the document must be located in a locked drawer inside a desk. When the game is run (e.g., executed by a processor), the Mission Object rules for the current level are applied to the generated 3D environment 132 having randomized features based on slots 120 and objects 124, as discussed above, to randomly determine in which desk object the document will be located within the generated or rendered 3D environment 132.

Figure 9:
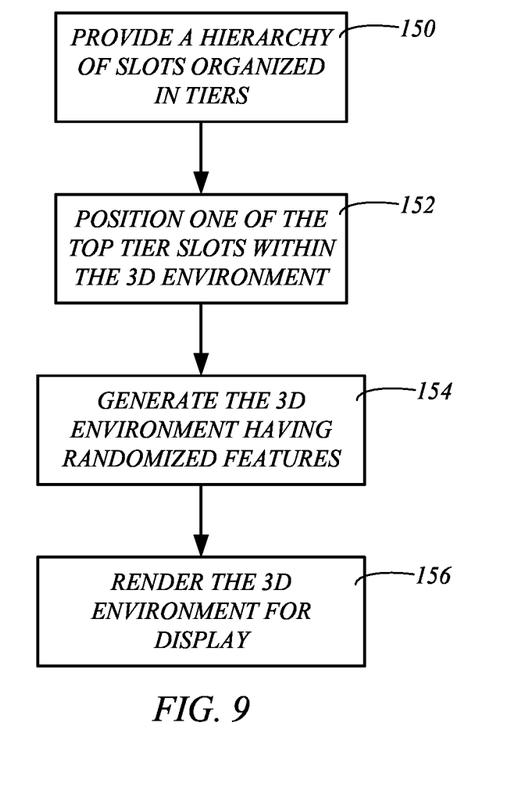
FIG. 9 is a flowchart illustrating an exemplary method of generating a portion of a 3D environment, in accordance with embodiments of the present disclosure.

FIG. 9 is a flowchart illustrating an example of a computer-implemented method of generating at least a portion of a virtual 3D environment, in accordance with embodiments of the present disclosure. This method may be implemented in response to the execution of the environment generation module 116, or other code using one or more processors.

At 150 of the method, a hierarchy of slots 120 may be provided, as shown in FIG. 2. The slots 120 are formed in accordance with one or more embodiments described above. For example, the slots 120 may be hierarchically organized in tiers from one or more top tier slots to one or more bottom tier slots, and each slot 120 may define a portion of a 3D environment 132 and include one or more layouts 123. Each of the layouts 123 of a non-bottom tier slot defines a position of at least one slot 120 from a lower tier within the portion of the 3D environment 132 defined by the non-bottom tier slot.

A dynamic virtual 3D environment may be designed or created using the editor tool 122 of the 3D generator module. For example, at 152 of the method, a designer may use the editor tool 122 to position one of the top tier slots 120 within the designer's view of a 3D environment on a display (e.g., display (output device) 112 of FIG. 1). This may involve, for example, selecting a block slot 120A from a group of unique predefined block slots and placing the selected block slot within the designer's view of the 3D environment (e.g., FIGS. 4A and 4B) using conventional techniques, such as dragging the selected block slot from a list of the block slots and dropping the selected block slot in the desired location within the 3D environment.

In some embodiments, the editor tool 122 allows the designer to modify, copy, rename, and/or perform other actions on the predefined slots 120 either before or after the selected slot is placed in the designer's view of the 3D environment. For example, the designer may adjust (e.g., modify, add or delete) layouts 123 in the top tier or lower tier slots, adjust the lower tier slots (e.g., slot type, such as small, medium or large room, the slot designation as dynamic or static, etc.), adjust objects 124 that are available in, or associated with the slots 120, and/or adjust other features of the slots 120 described above, using the editor tool 122. Additionally, the designer may select and add gameplay features 126 to the 3D environment, such as Mission Objects, using the editor tool 122. The created dynamic virtual 3D environment may be saved to memory (e.g., memory 104) as a 3D environment package 128 (FIG. 2).

At 154 of the method, such as after the dynamic 3D environment package 128 has been created, a generator 130 of the module 116 may generate the 3D environment 132 having randomized features. In some embodiments, this involves processing the 3D environment package 128 by randomly selecting one of the plurality of layouts 123 of the top tier slot and the lower tier slots included within the top tier slot that are defined within the package 128, and populating each of the selected layouts with one or more slots 120, and/or objects 124 associated with each slot that are arranged in the selected layout, as discussed above.

The generator 130 may also delete non-gameplay slots 120, objects 124 and actors that were not selected for forming the final 3D environment 132 to reduce the data file for the 3D environment. This reduces the data size of the generated virtual 3D environment 132.

The generator 130 may also run code to add a navigational mesh or "NavMesh" for the 3D environment 132 and link cover nodes, in accordance with conventional techniques. A NavMesh is a set of locations placed throughout the 3D environment 132 forming the game world that inform the friendly and enemy characters controlled by the computer ("AI" characters) how to navigate through the game world. Additionally, areas of the 3D environment 132 may be joined by linking "wire attach points" of portions of the 3D environment 132 (e.g., city blocks) using conventional techniques. Also, lighting calculations may be made to determine how to place light and shadows dynamically across everything in the 3D environment 132, using conventional techniques.

At 156 of the method, the 3D environment 132 having randomized features is rendered for display, such as on the display (output device) 112 of FIG. 1, using a suitable rendering engine 134. In some embodiments, the 3D environment 132 is generated (step 154) and rendered (step 156) during execution of a 3D video game, such as a game similar to Fortnite, for example.

The 3D environment 132 may also be generated in response to replaying a game level, or other instances in which the 3D environment 132 must be subsequently regenerated. This regeneration of the 3D environment 132 may include a repeat of step 154, resulting in the generation of a unique 3D environment 132 due to the randomization of features of the 3D environment 132 based on the 3D environment package 128. As a result, a first 3D environment 132 may be displayed on the display 112 based on a first 3D environment generated and rendered in accordance with method steps 150, 152, 154 and 156. Subsequently, a second 3D environment, which is different from the first 3D environment, may be generated based on a second performance of the method step 154 using the 3D environment package 128, and rendered for display on the display 112 in response to the performance of step 156. This process may be repeated to generate and display numerous unique virtual 3D environments 132.

The features of the 3D environment 132 that are randomized in step 154 of the method include one or more of the randomizable features described above, such as for each level of a game. For example, the randomized features may include:
- a city block having a randomized layout of plots and/or pathways;
- a plot within the city block having a randomized layout of buildings;
- a building within the plot having a randomized layout of floors or levels;
- a floor or level within the building having a randomized layout of rooms;
- a room within the building having a randomized layout of furniture; and/or
- a furniture set within the room having a randomized layout of furniture.

The randomized features of the 3D environment, such as for each level of a game, may also include, for example:
- randomized objects (e.g., final actors, types of items, etc.); and/or
- randomized options associated with objects (e.g., object design, surface treatments, etc.).

The random features may also include random gameplay features, such as for each level of a game, such as that designated by the spawn slot, which may include, for example:
- randomized game characters (e.g., enemies);
- randomized game character actions with an environment, other game characters, and/or the player(s);
- randomized game action (e.g., triggers for a game action, weapon emplacement); and/or
- randomized mission objectives for the player(s)
- randomized Mission Objects (e.g., the location of mission objects).

Similar techniques may be employed when generating outdoor environments within the 3D environment 132. For example, the city block slot may provide a layout for outdoor object slots, such as trees, bushes and grasses. A tree slot may include several different types of trees that can be randomized upon the generation of the 3D environment. Similarly, bush and grass slots may each include several variations of bushes and grasses that may be randomized upon the generation of the 3D environment.

In some embodiments, the generation of the 3D environment may be generated over a network using a server. The rendering of the 3D environment 132 for a game may be deterministic, such as through the use of a mutated seed algorithm. This ensures that the 3D environment can be generated multiple times with the same seed and get exactly the same result.

Figure 10:
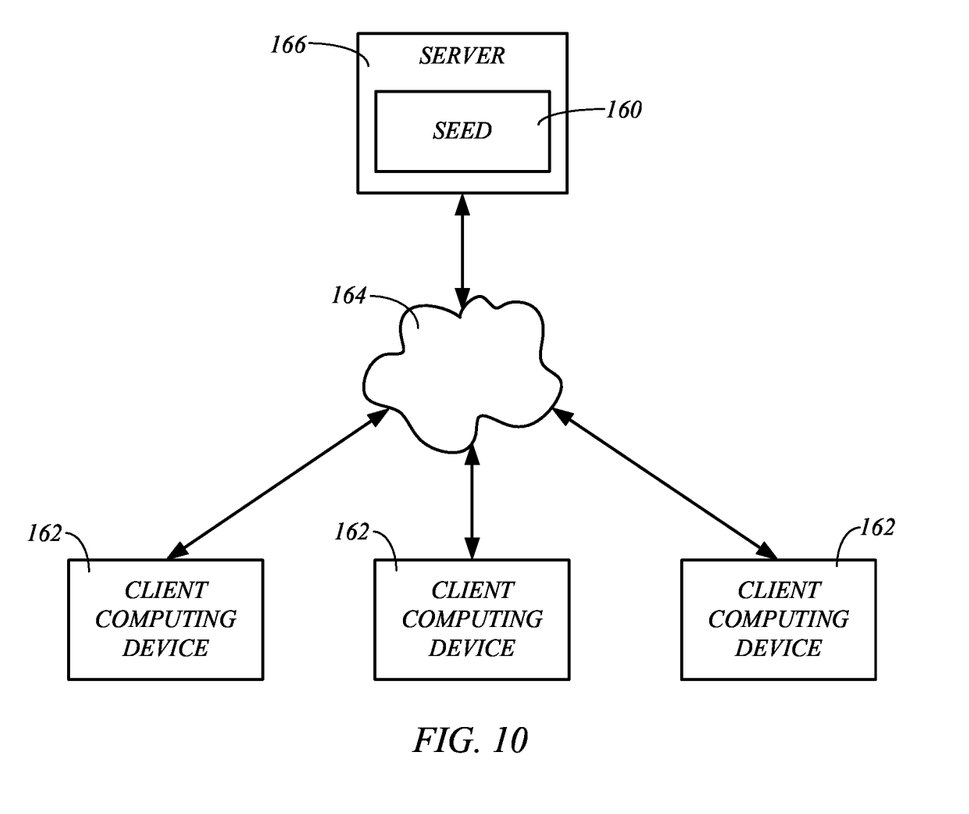
FIG. 10 is a simplified diagram illustrating the distribution of a seed defining a 3D environment to multiple client computing devices, in accordance with embodiments of the present disclosure.

Thus, the rendering of the 3D environment 132 for display (step 156) may include generating a seed of data that defines the 3D environment. The seed may then be transmitted to a plurality of client computing devices. For example, the seed 160 may be transmitted to client computing devices 162 through a network 164 by a server 166, such as illustrated in the simplified diagram of FIG. 10. The display of the 3D environment by each of the client computing devices 162 may be synchronized using the seed 160, in accordance with conventional techniques. This allows multiple players (executing the game on client computing devices) to experience the same 3D environment 132 while playing the same game. After the dynamic 3D environment is generated at the client devices 162, replicated objects may be forcibly deleted from the client devices 162 to ensure that a duplicate is not created.

As mentioned above, in one exemplary embodiment, the 3D environment generation module 116 may be integrated within UE4 to allow game developers to design the layouts of randomized game levels using Unreal Engine's editing tools, which may be represented by the editor tool 122 (FIG. 2), and are similar to the way an architect might use CAD software to design a building. Further, embodiments of the 3D environment generation module 116 may also modify Unreal Engine technologies to allow these randomized levels to be displayed on a screen as 3D virtual environments, contain computer-controlled characters, respond to environmental events, and perform other gaming-related functions.

Embodiments of the 3D environment generation module 116 may also leverage the core UE4 concept of "Actors" for its implementation. An "Actor" in UE4 can represent both real-world objects 124 in the 3D virtual environment 132, such as a wall, a piece of furniture, a building, or a character, as well as non-visual entities such as a game event trigger, a computer-controlled enemy spawn point, or information needed for computer-controlled characters to navigate the 3D game environment. From a technical/programming perspective, an Actor is implemented as a single object-oriented entity, commonly referred to herein as an object, with a set of features useful to many different types of Actors.

Embodiments of the 3D environment generation module 116 may also leverage UE4's ability to support an object-oriented programming technique called "inheritance," which creates a child Actor class that has the same behaviors, data, and features of an Actor, but whose behaviors can be changed or extended by injecting additional software code into the child Actor. Similarly, these child Actors can also have their own child Actors that inherit behaviors from their parent, creating even more opportunities to specialize or enhance behaviors.

Actors can also own sub-objects called "Components". Like Actors, Components can also pass behaviors to child Components through inheritance. When the game is run, embodiments of the 3D environment generation module may utilize a UE4 component called ChildActorComponent to dynamically spawn Actors of any given Actor type, thereby building out the virtual game world and all its pieces.

Game developers may lay out randomized game levels within the UE4 Editor tool using the 3D environment generation module 116. Embodiments of the 3D environment generation module 116 may modify the UE4 Editor to allow the designer to place Actors on the screen from within the UE4 Editor.

In some embodiments, developers design a 3D virtual environment by creating a "Layout Actor", which is made available by the 3D environment generation module 116. This may be done, for example, by choosing a "Create Layout Actor" option that the 3D environment generation module 116 makes available within the UE4 Editor's menu options. The designer then assigns behaviors and characteristics to this Layout Actor by using pop-up menus or other tools within the UE4 Editor. Developers can also add ChildActorComponents directly into a Layout Actor and direct these ChildActorComponents to spawn "Slot Actors" of whatever desired type. The developer then creates a Slot Actor and adds the Layout Actor just created to the Slot's list of Layouts it is able to spawn. Developers can create additional Layout Actors and add these to the Slot Actor's list of layouts as well.

The developer can then create a new Slot Actor that will hold Layout Actors that represent the next tier down of the 3D virtual environment and assign this Slot Actor to the ChildActorComponent of one of the Layout Actors assigned to the first Slot created. The designer repeats this process recursively to whatever depth is appropriate for the environments the designer desires.

Once these Layouts and Slots have been created (including the relationship between Slots and Layouts), the designer then creates actual game levels by placing Slot Actors into a UE4 "map," which is both a 2D and 3D representation of the 3D virtual environment having randomized features. These Slot Actors contain the list of top tier Layouts that can be chosen to trigger the randomization process.

Embodiments of the present disclosure are generally directed to computer-implemented methods and computer-readable media for generating virtual 3D environments having randomized features using hierarchically organized slots. Embodiments facilitate improvements in how 3D environments, such as 3D video game environments, are generated and displayed, as well as improvements in gameplay. For example, the randomized features of the 3D environment created and generated in accordance with embodiments of the present disclosure allow a 3D game world to change each time the game is played, while maintaining a high degree of visual fidelity, as well as designer control, over how the game world is structured.

In addition to these improvements to the technical field of 3D environment or game design and development, the improvements provided by embodiments of the present disclosure include improvements in the operation of computing devices. For example, the dynamic hierarchical slots allow for the random creation of different environments while remaining within the confines of the slots defining the 3D environment. This improves the operation of the computer by allowing for the design and storage of a vast number of unique virtual 3D environments without having to write separate programs for each 3D environment, and store each of the separate programs in memory of the system. Accordingly, embodiments of the present disclosure allow the computer to use less memory than would have been required if the numerous unique 3D environments formed in accordance with embodiments of the present disclosure were each stored separately using conventional techniques, resulting in faster computation time without sacrificing quality. Additionally, embodiments of the present disclosure improve the efficiency at which unique virtual 3D environments may be generated. These advancements are highly noteworthy and important in this technical field, and in the computer's abilities and performance.

Although the embodiments of the present disclosure have been described with reference to preferred embodiments, workers skilled in the art will recognize that changes may be made in form and detail without departing from the spirit and scope of the present disclosure.

What is claimed is:

1. A computer-implemented method of generating a virtual 3D environment comprising:
providing a hierarchy of slots organized in tiers from one or more top tier slots to one or more bottom tier slots, each slot defining a portion of a 3D environment and including a plurality of layouts, each of the layouts of a non-bottom tier slot defines a position of at least one slot from a lower tier within the portion of the 3D environment defined by the non-bottom tier slot;
positioning one of the top tier slots within the 3D environment;
generating the 3D environment comprising:
randomly selecting one of the plurality of layouts of the top tier slot and the lower tier slots included within the top tier slot; and
populating each of the selected layouts with one or more objects associated with each slot arranged in the selected layout; and
rendering the 3D environment for display.

2. The method of claim 1, wherein:
the objects associated with one or more of the slots include one or more dynamic objects each having a plurality of associated object options; and
populating each of the selected layouts with one or more objects associated with each slot arranged in the selected layer includes randomly selecting one of the object options associated with each of the dynamic objects and populating the corresponding selected layouts with the randomly selected object options.

3. The method of claim 2, wherein:
the objects associated with one or more of the slots include one or more static objects each defining a single object; and
populating each of the selected layouts with one or more objects associated with each slot arranged in the selected layer includes populating one or more of the selected layouts with the associated static objects.

4. The method of claim 1, wherein the portions of the 3D environment defined by the slots decrease in volume with each lower tier.

5. The method of claim 1, wherein each of the bottom tier slots defines a bottom portion of a 3D environment and includes one or more layouts each defining a position of one or more objects within the bottom portion.

6. The method of claim 1, wherein the hierarchy of slots includes a block slot representing a city block or gameplay level, the block slot including one or more layouts defining a position of one or more lower tier slots within a block portion of a 3D environment.

7. The method of claim 6, wherein each of the layouts of the block slot define a position of one or more plot slots within the block portion, each of the plot slots representing a plot of land and including one or more layouts each defining a position of one or more lower tier slots within a plot portion of the block portion.

8. The method of claim 1, wherein the hierarchy of slots includes a building slot representing a building, the building slot including one or more layouts defining a position of one or more lower tier slots within a building portion of a 3D environment.

9. The method of claim 8, wherein the building slot has a plurality of associated objects that define features of the building selected from the group consisting of one or more exterior shape objects each defining a unique exterior shape of the building, one or more exterior appearance objects each defining a unique appearance of an exterior of the building, and one or more window objects each defining a unique window of the building.

10. The method of claim 8, wherein each of the layouts of the building slot defines a position of one or more level slots within the building portion, each of the level slots representing a level of the building and including one or more layouts defining a position of one or more lower tier slots within a level portion of the building portion.

11. The method of claim 10, wherein the level slot has a plurality of associated objects that define features of the level of the building selected from the group consisting of one or more stairs objects each defining unique stairs of the level, and one or more hallway objects each defining a unique hallway of the level.

12. The method of claim 10, wherein each of the layouts of the level slot define a position of one or more room slots within the level portion, each of the room slots representing a room on the level of the building and including one or more layouts defining a position of one or more lower tier slots within a room portion of the level portion.

13. The method of claim 12, wherein each room slot has a plurality of associated objects that define features of the room selected from the group consisting of door objects each defining a unique door of the room, wall objects each defining a unique type of wall surface of the room, ceiling objects each defining a unique type of ceiling of the room, lighting objects each defining a unique light feature of the room, floor objects each defining a unique floor of the room, and window objects each defining a unique window of the room.

14. The method of claim 12, wherein each of the layouts of the room slot define a position of one or more furniture slots within the room portion, each of the furniture slots including one or more layouts defining a position of one or more furniture objects within a furniture portion of the room portion, each furniture object representing one or more pieces of furniture.

15. The method of claim 14, wherein the furniture objects are selected from the group consisting of one or more bed objects each defining a unique bed, one or more chair objects each defining a unique chair, one or more desk objects each defining a unique desk, one or more rug objects each defining a unique rug, one or more dresser objects each defining a unique dresser, and one or more bed and dresser objects each defining a unique bed and dresser set.

16. The method of claim 1, wherein:
the hierarchy of slots includes one or more room slots, each room slot representing a room in the 3D environment, and including one or more layouts defining a position of one or more lower tier slots within a room portion of the 3D environment; and
each room slot has a plurality of associated objects that define features of the room of a building selected from the group consisting of door objects each defining a unique door of the room, wall objects each defining a unique type of wall surface of the room, ceiling objects each defining a unique type of ceiling of the room, lighting objects each defining a unique light feature of the room, floor objects each defining a unique floor of the room, and window objects each defining a unique window of the room.

17. The method of claim 16, wherein:
each of the layouts of the room slot define a position of one or more furniture slots within the room portion;
each of the furniture slots including one or more layouts defining a position of one or more furniture objects within a furniture portion of the level portion, each furniture object representing one or more pieces of furniture; and
the furniture objects are selected from the group consisting of one or more bed objects each defining a unique bed, one or more chair objects each defining a unique chair, one or more desk objects each defining a unique desk, one or more rug objects each defining a unique rug, one or more dresser objects each defining a unique dresser, and one or more bed and dresser objects each defining a unique bed and dresser set.

18. The method of claim 1, further comprising:
displaying the rendered 3D environment as a first 3D environment;
regenerating the 3D environment comprising:
randomly selecting one of the plurality of layouts of the top tier slot and the lower tier slots included within the top tier slot; and
populating each of the selected layouts with one or more objects associated with each slot arranged in the selected layout; and
displaying the regenerated 3D environment as a second 3D environment, which is different from the first 3D environment.

19. The method of claim 1, wherein:
rendering the 3D environment comprises generating a seed of data that defines the 3D environment;
transmitting the seed to a plurality of client computing devices; and
synchronizing a display of the 3D environment by each of the client computing devices using the corresponding seed.

20. A non-transitory computer readable medium including a computer-implemented system for generating a virtual 3D environment, the system comprising:

a hierarchy of slots organized in tiers from one or more top tier slots to one or more bottom tier slots, each slot defining a portion of a 3D environment and including a plurality of layouts, each of the layouts of a non-bottom tier slot defines a position of at least one slot from a lower tier within the portion of the 3D environment defined by the non-bottom tier slot;

an editor tool configured to position one of the top tier slots within the 3D environment;

a generator configured to generate the 3D environment by:
    randomly selecting one of the plurality of layouts of the top tier slot and the lower tier slots included within the top tier slot; and
    populating each of the selected layouts with one or more objects associated with each slot arranged in the selected layout; and a virtual 3D environment rendering engine configured to render the 3D environment for display.

\* \* \* \* \*